(12) United States Patent
Molin et al.

(10) Patent No.: US 8,520,993 B2
(45) Date of Patent: Aug. 27, 2013

(54) MULTIMODE OPTICAL FIBER HAVING IMPROVED BENDING LOSSES

(75) Inventors: Denis Molin, Draveil (FR); Pierre Sillard, Le Chesnay (FR)

(73) Assignee: Draka Comteq, B.V., Amsterdam (NL)

( * ) Notice: Subject to any disclaimer, the term of this patent is extended or adjusted under 35 U.S.C. 154(b) by 318 days.

(21) Appl. No.: 12/878,449

(22) Filed: Sep. 9, 2010

(65) Prior Publication Data

US 2011/0058781 A1    Mar. 10, 2011

Related U.S. Application Data

(60) Provisional application No. 61/241,592, filed on Sep. 11, 2009.

(30) Foreign Application Priority Data

Sep. 9, 2009  (FR) ...................................... 09 04305

(51) Int. Cl.
G02B 6/028   (2006.01)
G02B 6/036   (2006.01)

(52) U.S. Cl.
USPC ......................................................... 385/124

(58) Field of Classification Search
USPC ......................................................... 385/124
See application file for complete search history.

(56) References Cited

U.S. PATENT DOCUMENTS

| | | | |
|---|---|---|---|
| 4,111,525 A | 9/1978 | Kaminow et al. | |
| 4,184,744 A | 1/1980 | Onoda et al. | |
| 4,222,631 A | 9/1980 | Olshansky | |
| 4,229,070 A | 10/1980 | Olshansky et al. | |
| 4,230,396 A | 10/1980 | Olshansky et al. | |
| 4,339,174 A | 7/1982 | Levin | |
| 4,406,517 A | 9/1983 | Olshansky | |
| 4,465,335 A | 8/1984 | Eppes | |
| 4,636,235 A | 1/1987 | Glessner et al. | |
| 4,636,236 A | 1/1987 | Glessner et al. | |
| 4,715,695 A | 12/1987 | Nishimura et al. | |
| 4,723,828 A | 2/1988 | Lowe et al. | |
| 4,838,643 A | 6/1989 | Hodges et al. | |
| 5,142,603 A | 8/1992 | Forrester | |

(Continued)

FOREIGN PATENT DOCUMENTS

| EP | 1921478 A1 | 5/2008 |
|---|---|---|
| EP | 2299302 A1 | 3/2011 |

(Continued)

OTHER PUBLICATIONS

French Search Report and Written Opinion in counterpart French Application No. 0904305 dated Apr. 14, 2010, pp. 1-7.

(Continued)

*Primary Examiner* — Eric Wong
(74) *Attorney, Agent, or Firm* — Summa, Additon & Ashe, P.A.

(57) ABSTRACT

The present invention embraces a multimode optical fiber that includes a central core having an alpha refractive index profile with respect to an outer optical cladding and a depressed trench positioned between the central core and the outer optical cladding. The central core's refractive index at its periphery is the same as the outer cladding's refractive index. Typically, an inner cladding is positioned between the central core and the depressed trench. The optical fiber achieves reduced bending losses without significantly increasing numerical aperture.

23 Claims, 5 Drawing Sheets

(56) References Cited

U.S. PATENT DOCUMENTS

| | | |
|---|---|---|
| 5,194,714 A | 3/1993 | Le Sergent |
| 5,381,503 A | 1/1995 | Kanamori et al. |
| 5,522,007 A | 5/1996 | Drouart et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,126 B1 | 10/2002 | Mukasa |
| 6,493,491 B1 | 12/2002 | Shen et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,162,128 B2 | 1/2007 | Lovie et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,406,235 B2 | 7/2008 | Guan et al. |
| 7,421,172 B2 | 9/2008 | Matthijsse et al. |
| 7,421,174 B2 | 9/2008 | Fleming, Jr. et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,539,381 B2 | 5/2009 | Chen et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,783,149 B2 | 8/2010 | Fini |
| 7,787,731 B2 | 8/2010 | Bookbinder et al. |
| 7,817,891 B2 | 10/2010 | Lavenne et al. |
| 7,826,691 B2 | 11/2010 | Matthijsse et al. |
| 7,865,050 B1 | 1/2011 | Sun et al. |
| 7,878,712 B2 | 2/2011 | Shimotakahara et al. |
| 7,903,917 B2 * | 3/2011 | Bickham et al. ............ 385/124 |
| 7,903,918 B1 | 3/2011 | Bickham et al. |
| 8,428,411 B2 * | 4/2013 | de Montmorillon et al. . 385/124 |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0146260 A1 * | 7/2004 | Kalish et al. ................ 385/127 |
| 2005/0008312 A1 | 1/2005 | Jang et al. |
| 2008/0166094 A1 | 7/2008 | Bookbinder et al. |
| 2008/0292262 A1 | 11/2008 | Overton et al. |
| 2009/0059353 A1 | 3/2009 | Fini |
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067855 A1 | 3/2010 | Barker |
| 2010/0067857 A1 | 3/2010 | Lovie et al. |
| 2010/0067858 A1 * | 3/2010 | Kim et al. ................... 385/124 |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0220966 A1 | 9/2010 | Bennett |
| 2010/0254653 A1 | 10/2010 | Molin et al. |
| 2010/0310218 A1 | 12/2010 | Molin et al. |
| 2011/0002590 A1 | 1/2011 | Ooizumi et al. |
| 2011/0026889 A1 | 2/2011 | Risch et al. |
| 2011/0037183 A1 | 2/2011 | Tudury et al. |
| 2011/0044594 A1 | 2/2011 | Tudury et al. |
| 2011/0044595 A1 | 2/2011 | Sillard et al. |
| 2011/0044596 A1 | 2/2011 | Zhang et al. |
| 2011/0054861 A1 | 3/2011 | Lane |
| 2011/0054862 A1 | 3/2011 | Pimpinella et al. |
| 2011/0058781 A1 | 3/2011 | Molin et al. |
| 2011/0064367 A1 | 3/2011 | Molin et al. |
| 2013/0028564 A1 * | 1/2013 | Molin et al. ................ 385/124 |
| 2013/0071114 A1 * | 3/2013 | Bickham et al. ............ 398/44 |

FOREIGN PATENT DOCUMENTS

| | | |
|---|---|---|
| JP | 08-304636 A | 11/1996 |
| JP | 11-064665 A | 3/1999 |
| JP | 2000-347057 A2 | 12/2000 |
| JP | 2003-47057 A2 | 12/2000 |

| | | | |
|---|---|---|---|
| JP | 2002-318315 A | 10/2002 | |
| JP | 2006-047719 A | 2/2006 | |
| JP | 2006-078543 A | 3/2006 | |
| JP | 2006-227173 A | 8/2006 | |
| WO | 03/081301 A1 | 10/2003 | |
| WO | 2005/106544 A1 | 11/2005 | |
| WO | 2006/010798 A1 | 2/2006 | |
| WO | 2008/085851 A1 | 7/2008 | |
| WO | 2009/062131 A1 | 5/2009 | |
| WO | 2009/078962 A1 | 6/2009 | |
| WO | 2010/036684 A2 | 4/2010 | |
| WO | 2011/040830 A1 | 4/2011 | |

OTHER PUBLICATIONS

Kashima et al., "Transmission characteristics of graded-index optical fibers with lossy outer layer," Applied Optics USA, vol. 17, No. 8, Apr. 15, 1978, pp. 1-10.

Gloge, "Multimode Theory of Graded Core Fibers," Bell system Technical Journal 1973, pp. 1563-1578.

Yabre, "Comprehensive Theory of Dispersion in Graded Index Optical Fibers," Journal of Lightwave Technology, Feb. 2000, vol. 18, No. 2, pp. 166-177.

European Search Report and Written Opinion in counterpart European Application No. 10175717 dated Nov. 22, 2010, pp. 1-6.

Sasaki, P.L. Francois, D.N. Payne, "Accuracy and resolution of preform index-profiling by the spatial-filtering method," ECOC'81, 6.4-1, Copenhagen, Denmark, Sep. 1981.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glascow, Scotland, pp. 1-2.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

* cited by examiner

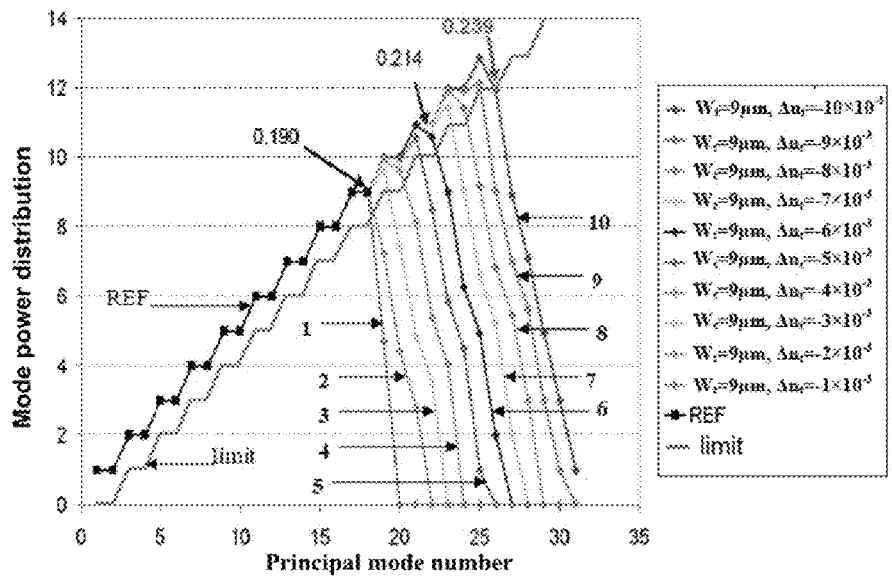
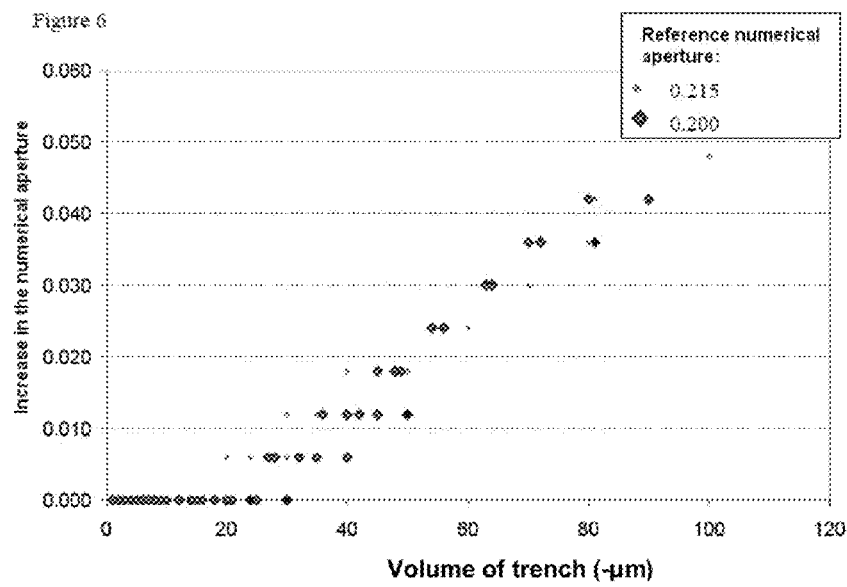

MULTIMODE OPTICAL FIBER HAVING IMPROVED BENDING LOSSES

CROSS-REFERENCE TO PRIORITY APPLICATIONS

This application claims the benefit of commonly assigned pending French application Ser. No. 09/04305 for a "Fibre Optique Multimode Présentant des Pertes en Courbure Améliorées" (filed Sep. 9, 2009, at the National Institute of Industrial Property (France)), which is hereby incorporated by reference in its entirety.

This application further claims the benefit of commonly assigned U.S. Patent Application No. 61/241,592 for a "Fibre Optique Multimode Présentant des Pertes en Courbure Améliorées" (filed Sep. 11, 2009), which is hereby incorporated by reference in its entirety.

FIELD OF THE INVENTION

The present invention relates to the field of optical fiber transmissions and, more specifically, to a multimode optical fiber having reduced bending losses.

BACKGROUND

An optical fiber conventionally includes an optical core, which transmits and/or amplifies an optical signal, and an optical cladding, which confines the optical signal within the core. Accordingly, the refractive index of the core $n_c$ is typically greater than the refractive index of the outer cladding $n_g$ (i.e., $n_c > n_g$).

The refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding is shown on the y-axis. The refractive index profile is referred to as a "step" profile, a "trapezoidal" profile, an "alpha" profile, or a "triangular" profile for graphs having the respective shapes of a step, a trapezoid, an alpha, or a triangle. These curves are generally representative of the optical fiber's theoretical profile (i.e., the set profile). Constraints in the manufacture of the optical fiber, however, may result in a slightly different actual profile.

Generally speaking, two main categories of optical fibers exist: multimode fibers and single-mode fibers. In a multimode fiber, for a given wavelength, several optical modes are propagated simultaneously along the optical fiber, whereas in a single-mode fiber the higher order modes are strongly attenuated.

Multimode graded-index fibers with an "alpha" profile of the central core have been used for many years, and their characteristics have been described in particular in "*Multimode Theory of Graded Core Fibers*" by D. Gloge et al., Bell system Technical Journal 1973, pp. 1563-1578, and summarized in "*Comprehensive Theory of Dispersion in Graded Index Optical Fibers*" by G. Yabre, Journal of Lightwave Technology, February 2000, Vol. 18, No. 2, pp. 166-177. Each of the above-referenced articles is hereby incorporated by reference in its entirety.

A graded-index profile (i.e., an alpha-index profile) can be described by a relationship between the refractive index value n and the distance r from the center of the optical fiber according to the following equation:

$$n = n_1 \sqrt{1 - 2\Delta\left(\frac{r}{r_1}\right)^\alpha}$$

wherein, $\alpha \geq 1$, and $\alpha$ is a non-dimensional parameter that is indicative of the shape of the refractive index profile;

$n_1$ is the maximum refractive index of the multimode optical fiber's core;

$r_1$ is the radius of the multimode optical fiber's core; and $$\Delta = \frac{(n_1^2 - n_0^2)}{2n_1^2}$$

where $n_0$ is the minimum index of the multimode core, which generally corresponds to the index of the outer optical cladding (most often made of silica).

Each mode, however, is propagated with its own propagation constant with which an effective refractive index $n_{\mathit{eff}}$ can be associated, which is a function of the refractive index profile of the optical fiber and the wavelength.

FIG. 1 depicts the refractive index profile of a comparative $\alpha$-profile optical fiber. The radius of the optical fiber is plotted on the lower x-axis, and the $\alpha$-profile of the optical fiber's refractive index is plotted on the left-side y-axis. As depicted, a multimode $\alpha$-profile optical fiber has a central core profile with a rotational symmetry such that along any radial direction of the optical fiber the value of the refractive index decreases continuously from the center of the optical fiber to the core's periphery. FIG. 1 also shows the modes that are propagated within the optical fiber. The right-side y-axis shows the relative effective refractive indices of the propagation modes (i.e., the difference between the mode's effective refractive index and the outer optical cladding's refractive index). A reference called the "azimuthal index" (plotted on the upper x-axis) corresponds to each mode. Typically, the modes collect together in groups of visible modes in a horizontal direction of the graph. For example, the optical fiber shown in FIG. 1 includes 18 mode groups.

The numerical aperture (NA) of an optical fiber is defined by the following equation:

$$NA = \sqrt{n_{\mathit{eff,max}}^2 - n_{\mathit{eff,min}}^2}$$

where $n_{\mathit{eff,min}}$ and $n_{\mathit{eff,max}}$ are respectively the minimum and maximum effective refractive indices of the modes within the signal, measured at the fiber output under OFL (overfilled launch) conditions (i.e., when the excitation of the signal at the fiber input is uniform over all the propagation modes).

A general approximation of the numerical aperture (ON), however, may be obtained with the following equation:

$$ON = \sqrt{n_{\max}^2 - n_{\min}^2}$$

where $n_{max}$ and $n_{min}$ are respectively the maximum and minimum refractive indices of the optical fiber's refractive index profile.

Typically, a depressed trench is added between the central core and the outer optical cladding to reduce the bending losses of a multimode graded-index optical fiber. The addition of such a depressed trench, however, results in the development of additional propagation modes known as leaky modes.

FIG. 2 further depicts the refractive index profile of the comparative optical fiber shown in FIG. 1, with the addition of a depressed trench between the central core and the outer optical cladding. Additional propagation modes are observed below the zero value of the relative effective refractive index (i.e., with respect to FIG. 1 and defined by the refractive index of the outer optical cladding). These additional propagation modes (i.e., leaky modes) are placed in five mode groups. The leaky modes have effective refractive indices that are lower than those of the guided modes. These leaky modes increase the numerical aperture of graded-index optical fibers having a depressed trench in comparison to the graded-index optical fibers without a depressed trench. A difference in numerical aperture can cause losses during connections within a system that employs both (i) depressed trench graded-index fibers and (ii) graded-index fibers without a depressed trench. Thus, the addition of a depressed trench to a graded-index profile gives rise to an undesirable increase in the numerical aperture. Therefore, it is desirable to limit the increase of the numerical aperture caused by the addition of a depressed trench.

U.S. Patent Application Publication No. 2008/0166094 and International Publication No. WO 2008/085851, each of which is hereby incorporated by reference in its entirety, disclose the use of a depressed trench for reducing the bending losses in a graded-index optical fiber. The publications, however, do not disclose how to limit the increase of the numerical aperture (i.e., relative to the numerical aperture of a graded-index fiber without a depressed trench). In other words, these publications fail to disclose how to avoid a large increase in the numerical aperture due to the addition of a depressed trench.

International Publication No. WO 2006/010798, which is hereby incorporated by reference in its entirety, describes an optical fiber including a graded-index central core and a depressed trench. The graded-index profile of the central core is extended beneath the refractive index of the outer optical cladding to the bottom of the depressed trench. In other words, there is no abrupt drop in the refractive index at the start of the depressed trench, but instead there is a gradual decrease until the bottom of the depressed trench is reached. The extension of the alpha-shaped central core beneath the refractive index of the outer optical cladding to the bottom of the depressed trench limits the reduction in the bending losses while further increasing the numerical aperture. Furthermore, International Publication No. WO 2006/010798 does not disclose how to limit the increase of the numerical aperture (i.e., relative to the numerical aperture of a graded-index fiber without a depressed trench).

Therefore, a need exists for a graded-index optical fiber having reduced bending losses without a significantly increased numerical aperture.

SUMMARY

Accordingly, in one aspect, the present invention embraces a multimode optical fiber that includes a central core (i.e., an optical core) having an alpha-index profile with respect to an outer optical cladding and a depressed trench positioned around the central core. Typically, an inner cladding is positioned between the central core and the depressed trench.

In an exemplary embodiment, the optical fiber's numerical aperture is less than 0.015 larger than the numerical aperture of a comparative optical fiber having the same index profile but without a depressed trench.

In another exemplary embodiment, the optical fiber's numerical aperture is less than 0.010 larger than the numerical aperture of a comparative optical fiber having the same index profile but without a depressed trench.

In yet another exemplary embodiment, the diameter of the optical fiber's central core is 62.5±3 μm, and the optical fiber's numerical aperture is 0.275±0.015.

In yet another exemplary embodiment, the diameter of the optical fiber's central core is 50±3 μm, and the optical fiber's numerical aperture is 0.2±0.015.

In yet another exemplary embodiment, the optical fiber's depressed trench has a refractive index difference $\Delta n_t$ with the outer optical cladding of between about $-6\times10^{-3}$ and $-15\times10^{-3}$ (e.g., between about $-8\times10^{-3}$ and $-12\times10^{-3}$).

In yet another exemplary embodiment, the optical fiber's depressed trench has a refractive index difference $\Delta n_t$ with the outer optical cladding of between about $-7\times10^{-3}$ and $-10\times10^{-3}$ (e.g., between about $-7.5\times10^{-3}$ and $-9.5\times10^{-3}$).

In yet another exemplary embodiment, the optical fiber's depressed trench has a refractive index difference $\Delta n_t$ with the outer optical cladding greater than about $-9\times10^{-3}$ (e.g., between about $-6.5\times10^{-3}$ and $-8.5\times10^{-3}$).

In yet another exemplary embodiment, the optical fiber's depressed trench has a width $W_t$ of less than about 4.5 microns (e.g., between 3 and 4.5 microns).

In yet another exemplary embodiment, the optical fiber's depressed trench has a width $W_t$ of at least about 1.5 microns (e.g., between about 2.5 and 4 microns).

In yet another exemplary embodiment, the optical fiber's depressed trench has a width $W_t$ of at least 2 microns (e.g., at least about 3 microns).

In yet another exemplary embodiment, the optical fiber's depressed trench has a volume V between about −30 microns and −40 microns (e.g., about −35 microns) as defined by the expression $V=1000\times W_t \times \Delta n_t$.

In yet another exemplary embodiment, the difference between the inner cladding's radius $r_2$ and the central core's radius $r_1$ (i.e., the width of the inner cladding) is less than about 5 microns (e.g., between about 2 microns and 4 microns).

In yet another exemplary embodiment, the optical fiber does not include an inner cladding such that the depressed trench directly surrounds the central core.

In yet another exemplary embodiment, the optical fiber has bending losses at a wavelength of 850 nanometers for two turns around a radius of curvature of 15 millimeters reduced by at least 40 percent with respect to a comparative optical fiber having the same index profile but without a depressed trench.

In yet another exemplary embodiment, the optical fiber has bending losses at a wavelength of 850 nanometers for two turns around a radius of curvature of 10 millimeters reduced by at least 30 percent with respect to a comparative optical fiber having the same index profile but without a depressed trench.

In yet another exemplary embodiment, the optical fiber has bending losses at a wavelength of 850 nanometers for two turns around a radius of curvature of 7.5 millimeters reduced by at least 20 percent with respect to a comparative optical fiber having the same index profile but without a depressed trench.

In yet another exemplary embodiment, the optical fiber has bending losses at a wavelength of 850 nanometers for two turns around a radius of curvature of 5 millimeters reduced by at least 20 percent with respect to a comparative optical fiber having the same index profile but without a depressed trench.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 5 graphically depicts the mode power distribution after two meters under OFL conditions of trench-assisted multimode fibers with a nine-micron trench and varying depths.

FIG. 6 graphically depicts the increase in numerical aperture induced by the addition of a depressed trench as a function of the volume of the depressed trench.

DETAILED DESCRIPTION

The present invention embraces a multimode optical fiber that achieves reduced bending losses without significantly increasing numerical aperture.

Figure 3:
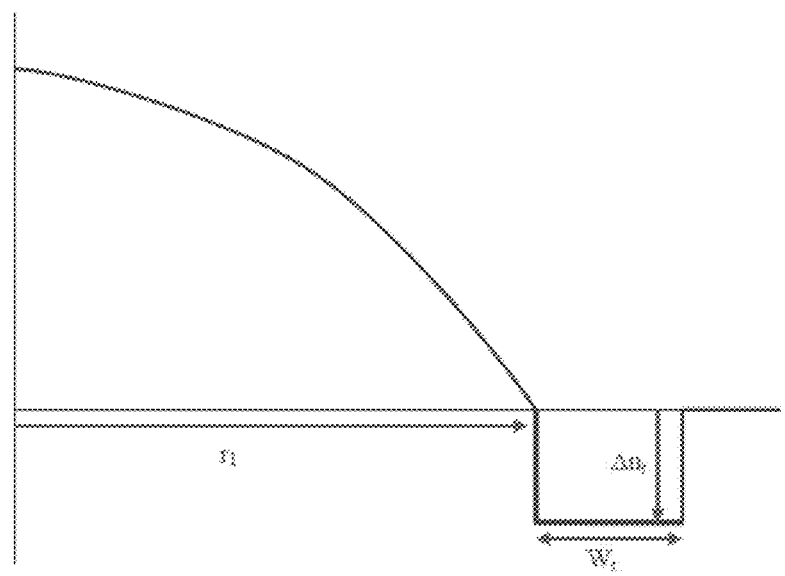
FIG. 3 schematically depicts the refractive index profile of an exemplary optical fiber.
Figure 8:
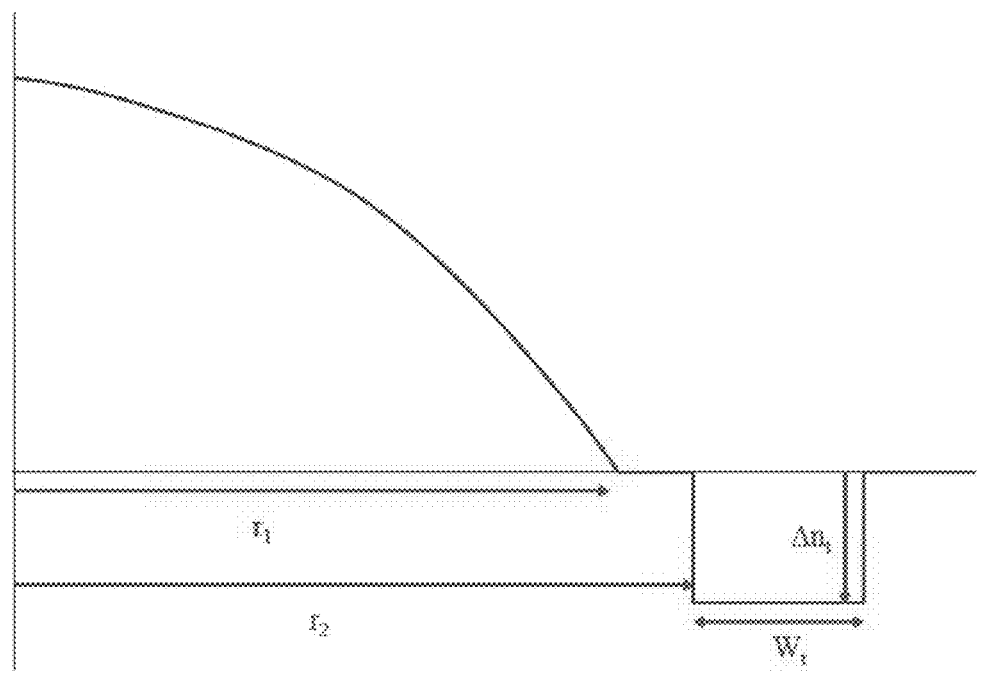
FIG. 8 schematically depicts the refractive index profile of an exemplary optical fiber.

In this regard, refractive index profiles of two optical fibers are schematically depicted in FIGS. 3 and 8, respectively. The optical fibers depicted in FIGS. 3 and 8 are multimode optical fibers having (i) a central core with radius $r_1$ and an alpha index profile with respect to the outer optical cladding and (ii) a depressed trench having a constant width $W_t$ (i.e., a rectangular, step refractive index profile) and a refractive index difference $\Delta n_t$ with the outer optical cladding.

Typically, optical fibers according to the present invention include a depressed trench having a volume V of less than about −40 microns (e.g., between −30 microns and −40 microns). As used herein, the volume V of the depressed trench is defined by the equation $V = 1000 \times W_t \times \Delta n_t$.

As depicted in FIG. 8, the optical fiber according to one embodiment of the present invention includes (i) a central core having a radius $r_1$ and an alpha index profile with respect to an outer optical cladding, (ii) an inner cladding having a radius $r_2$ and a refractive index difference $\Delta n_2$ with respect to the outer optical cladding, and (iii) a depressed trench having a width $W_t$ and an index difference $\Delta n_t$ with respect to the outer optical cladding. Typically, the refractive index difference between the end of the graded central core (i.e., at radius $r_1$) and the outer optical cladding is zero, and the volume V of the depressed trench is between about −30 microns and −40 microns.

The range of values for the volume V of the depressed trench and the refractive index difference between the end of the graded central core and the outer optical cladding ensure that the leaky modes propagated in the depressed trench have limited power. Thus, the contribution of the leaky modes to the signal transmitted by the optical fiber is reduced, and the numerical aperture is only slightly increased in comparison with that of a graded-index fiber without a depressed trench. The graded-index optical fiber according to the present invention has reduced bending losses without exhibiting a significant increase in its numerical aperture.

As used herein, a comparative optical fiber "without a depressed trench" refers to an optical fiber that has an otherwise identical refractive index profile as the optical fiber to which it is being compared, except the trench is replaced with a material having a refractive index that is the same as the outer cladding. Stated differently, the comparative optical fiber "without a depressed trench" sets the refractive index of the trench region to that of the outer cladding (i.e., the refractive index difference $\Delta n_t$ is zero).

Figure 1:
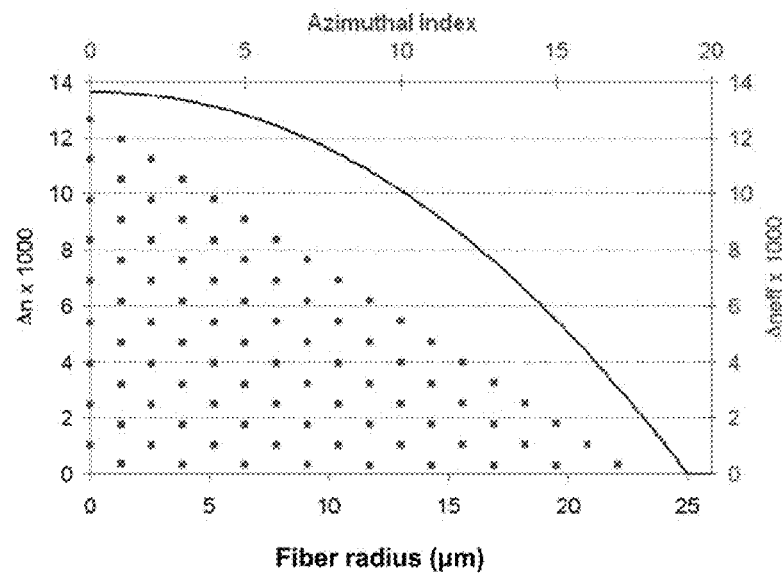
FIG. 1 schematically depicts (i) the refractive index profile of an optical fiber having an alpha (α) refractive index profile and (ii) the modes propagating in the optical fiber.
Figure 2:
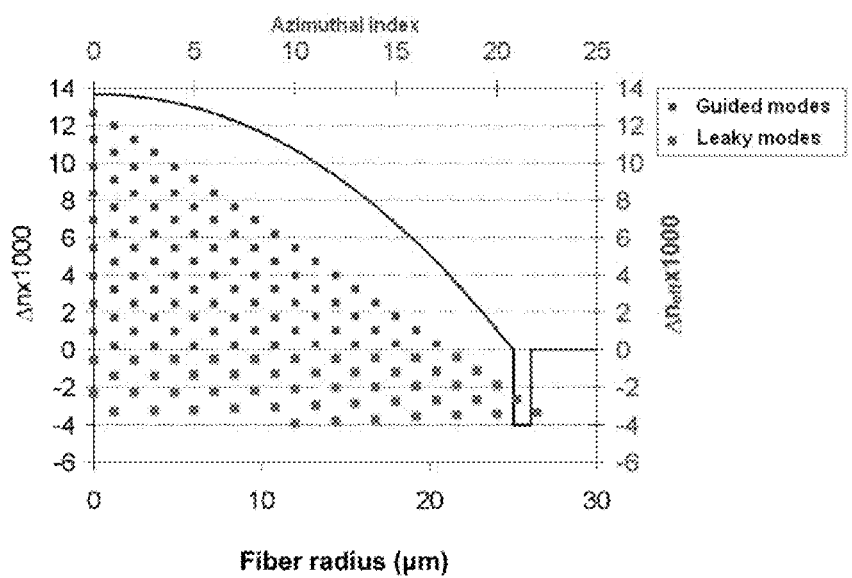
FIG. 2 schematically depicts (i) the refractive index profile of the optical fiber of FIG. 1 further including a depressed trench and (ii) the modes propagating in the optical fiber.
Figure 4:
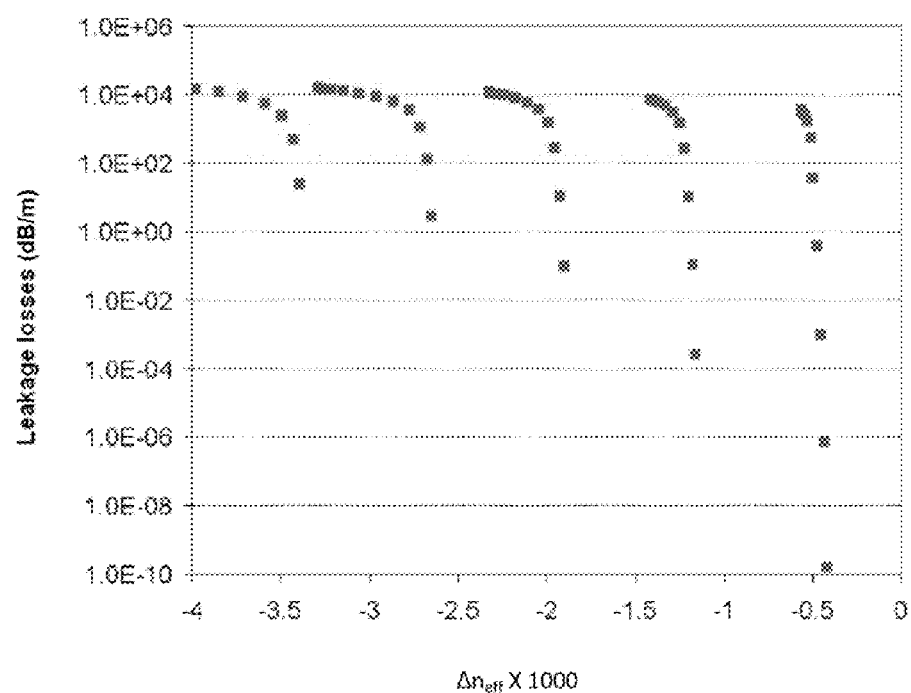
FIG. 4 graphically depicts the leakage losses of the leaky modes as a function of the relative effective refractive indices of the modes in the optical fiber of FIG. 2.

In a multimode graded-index optical fiber having a depressed trench, the leaky modes experience leakage losses during their propagation in the optical fiber. FIG. 4 shows the simulated leakage losses in dB/m experienced by the leaky modes as a function of their relative effective refractive indices in an optical fiber having the refractive index profile described in FIG. 2. The five successive graphs show each of the different mode groups.

A comparison of the graphs of the mode groups shows that the mode groups having effective refractive indices of less than $-2.5 \times 10^{-3}$ have modes in which the leakage losses are greater than 1 dB/m. The mode groups having effective refractive indices greater than $-2.5 \times 10^{-3}$, however, have modes in which the leakage losses can be less than 1 dB/m. Thus, the lower the effective refractive index of the mode group, the higher the leakage losses. As a result, the leaky mode groups contribute differently to the signal propagating along the optical fiber depending on the value of their effective refractive index.

Figure 9:
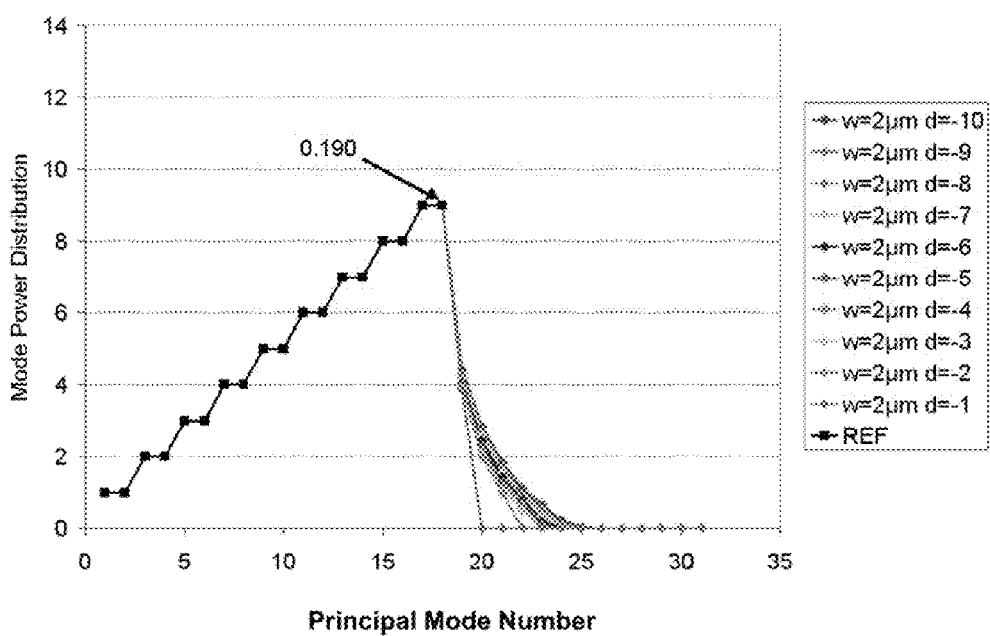
FIG. 9 graphically depicts the mode power distribution after two meters under OFL conditions of trench-assisted multimode fibers with a two-micron trench and varying depths.

The influence of the leaky modes on the calculation of the numerical aperture will be better understood with reference to FIG. 5 and FIG. 9. FIGS. 5 and 9 show the simulated power distribution in the mode groups after propagation over two meters in an optical fiber having experienced an excitation in OFL (overfill launch) conditions (i.e., with a uniform excitation of all the mode groups). The x-axis shows the principal mode number (or order) of each mode group.

The respective curves denoted "REF" in FIGS. 5 and 9 are the reference curves characteristic of a graded-index optical fiber without a depressed trench. As shown in FIGS. 5 and 9, the first 18 mode groups have an increasing power contribution. The 18$^{th}$ mode group is the mode group for which the effective refractive index is used as minimum effective refractive index $n_{eff,min}$ when calculating the numerical aperture of the optical fiber. A numerical aperture of 0.190 is then found.

With respect to FIG. 5, curves 1 to 10 are collected on graded-index optical-fiber examples (e.g., prophetic examples) having a depressed trench width of 9 microns (μm) and a refractive index difference $\Delta n_t$ between $-1 \times 10^{-3}$ and $-10 \times 10^{-3}$. In other words, curves 1 to 10 correspond to optical fibers having a depressed-trench volume V between −9 and −90 microns. (By way of comparison, the optical-fiber examples depicted in FIG. 9 have a depressed trench width of 2 microns.)

By adding a depressed trench to the reference fiber, further mode groups are added. For example, in FIG. 5, curve 6 corresponds to a reference optical fiber having a depressed trench having a width of 9 microns and a refractive index difference of $-6 \times 10^{-3}$. It is observed that curve 6 has eight additional leaky mode groups in comparison with the reference curve (i.e., the order 19 to 26 mode groups). When calculating the numerical aperture of the optical fiber corresponding to curve 6, the order 26 mode group's effective refractive index is used as minimum effective refractive index $n_{\mathit{eff,min}}$.

When calculating the numerical aperture, the contribution of a mode group is considered significant if the following relationship is satisfied:

$$\sum_{i=1}^{n} 10^{-2\alpha_i} > E\left(\frac{m-1}{2}\right)$$

wherein, n is the number of modes in the mode group of order m, $\alpha_i$ is the leakage loss in dB/m of the $i^{th}$ mode of the mode group of order m, and $$E\left(\frac{m-1}{2}\right)$$

is the integer part of the fraction $$\frac{m-1}{2}.$$

This relationship can also be shown graphically by means of the limiting curve shown as steps in FIG. 5 representing the function $$E\left(\frac{m-1}{2}\right).$$

Thus, for an optical fiber, the last mode group having its point representing its power distribution situated above the limiting curve is the mode group whose effective refractive index can be used as $n_{\mathit{eff,min}}$ when calculating an optical fiber's numerical aperture.

In the example of the optical fiber that includes a depressed trench having a width of 9 microns and a refractive index difference with the outer optical cladding of $-6 \times 10^{-3}$ (i.e., curve 6), the last mode group whose point representing its power distribution is located above the limiting curve is the mode group of order 22. By considering the effective refractive indices of the mode groups of orders 1 and 22, a numerical aperture of 0.214 is found. The numerical aperture value thus obtained is less than that which would be obtained by considering the effective refractive index of the mode group of order 26, which is the last mode group propagating in the optical fiber. The numerical aperture value obtained using the mode groups of orders 1 and 22, however, reflects the actual numerical aperture of the multimode optical fiber that includes a depressed trench (i.e., under operating conditions).

Thus, the attenuation experienced by the higher-order mode groups allows them to be ignored when calculating the numerical aperture of the optical fiber.

The curves in FIG. 5 also show that the number of leaky mode groups added by a depressed trench depends on the volume of the depressed trench.

In exemplary embodiments, the optical fiber according to the present invention has a depressed-trench volume between about −30 microns and −40 microns. A depressed-trench volume within this range limits the increase in the numerical aperture with respect to an optical fiber without a depressed trench, yet facilitates a significant reduction in the bending losses.

Figure 7:
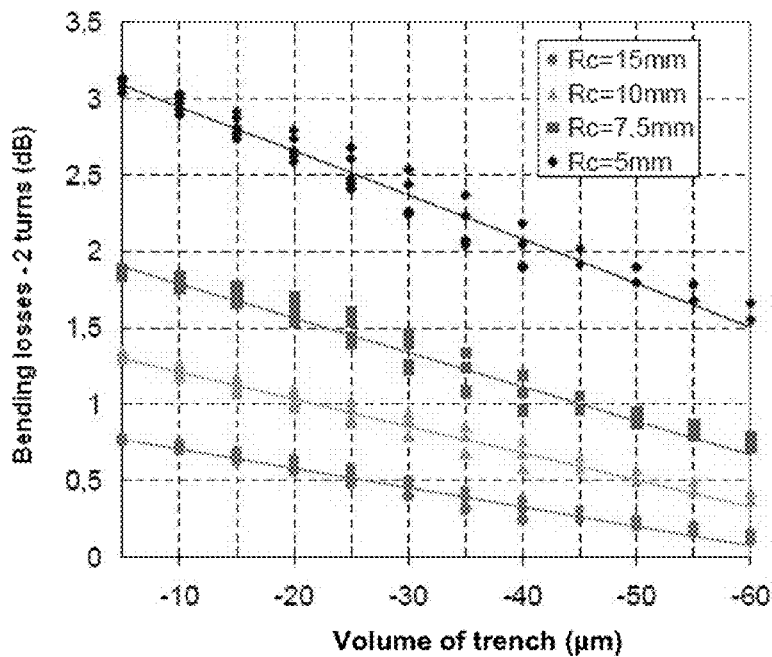
FIG. 7 graphically depicts the bending losses for two turns around a radius of curvature $R_c$ varying between 5 millimeters and 15 millimeters as a function of the volume of the depressed trench.

The value range of the depressed trench's volume will be better understood by referring to the graphs of FIGS. 6 and 7, which illustrate aspects of the present invention by providing data from both inventive and comparative optical-fiber examples (e.g., prophetic examples).

In FIG. 6, the y-axis depicts the difference between the numerical aperture of an α-profile multimode optical fiber having a depressed trench and a reference multimode optical fiber having an equivalent alpha (α) profile albeit without a depressed trench. The volume of the depressed trench is shown on the x-axis. FIG. 6 shows the results for reference optical fibers having a numerical aperture of 0.200 and for reference optical fibers having a numerical aperture of 0.215.

In FIG. 7, the y-axis shows the bending losses at a wavelength of 850 nanometers for two turns at respective radii of curvature $R_c$ of 5 millimeters, 7.5 millimeters, 10 millimeters, and 15 millimeters, on α-profile multimode optical fibers having a depressed trench. The volume of the depressed trench is shown on the x-axis.

Note that the graphs of FIGS. 6 and 7 plot several pairs ($W_t$, $\Delta n_t$) for the same depressed-trench volume V.

In comparison with an optical fiber having a similar refractive index profile but without a depressed trench, it is observed that an α-profile multimode optical fiber having a depressed trench with a volume of less than −40 microns has bending losses for two turns at 850 nanometers that are reduced by at least 60 percent at a $R_c$ of 15 millimeters, at least 50 percent at a $R_c$ of 10 millimeters, at least 40 percent at a $R_c$ of 7.5 millimeters, and at least 40 percent at a $R_c$ of 5 millimeters. The numerical aperture of the optical fiber, however, may be increased by more than 0.015 with respect to an otherwise equivalent α-profile multimode optical fiber without a depressed trench. This can lead to losses (i.e., signal losses) when such optical fibers are connected to an optical fiber without a depressed trench.

It is also observed that an α-profile multimode optical fiber having a depressed trench with a volume greater than −30 microns (e.g., −10 microns) shows an increase in the numerical aperture of less than 0.010 with respect to an otherwise equivalent α-profile multimode optical fiber without a depressed trench. With a depressed trench having a volume greater than −30 microns, however, the bending losses for two turns at 850 nanometers with respect to an optical fiber having a similar index profile but without a depressed trench are reduced by less than 40 percent for a $R_c$ of 15 millimeters, less than 30 percent for a $R_c$ of 10 millimeters, less than 20 percent for a $R_c$ of 7.5 millimeters, and less than 20 percent for a $R_c$ of 5 millimeters. Therefore, the addition of a depressed trench having a volume greater than −30 microns appears less significant in reducing bending losses.

In another exemplary embodiment, the optical fiber according to the present invention has a depressed-trench volume that facilitates an increase in the numerical aperture of less than 0.015 (e.g., less than 0.010) when compared with an optical fiber having the same refractive index profile but without a depressed trench. In other words, the optical fiber according to the present invention limits the increase of the numerical aperture that is encountered due to the addition of a depressed trench. The bending losses for two turns at 850 nanometers in the optical fiber of the present invention as compared to an optical fiber having a similar index profile without a depressed trench are reduced by at least 40 percent (e.g., 45 percent or more) for a $R_c$ of 15 millimeters, at least 30 percent (e.g., 35 percent or more) for a $R_c$ of 10 millimeters, at least 20 percent (e.g., 25 percent or more) for a $R_c$ of 7.5 millimeters, and at least 20 percent (e.g., 25 percent or more) for a $R_c$ of 5 millimeters. Thus, the present optical fiber makes it possible to limit the increase in the numerical aperture with respect to an optical fiber without depressed trench while providing a significant reduction in the bending losses.

In another exemplary embodiment, the optical fiber according to the present invention has a refractive index difference of zero between the end of the graded central core (i.e., at the central core's radius $r_1$) and the outer optical cladding. The optical fiber has bending losses that are less than those of an optical fiber having a similar profile but including a central core that is extended beneath the outer optical cladding, such as the optical fiber disclosed in International Publication No. WO 2006/010798. For example, for small radii of curvature and for the higher-order modes, the optical fiber according to the present invention has bending losses ten times less than an optical fiber having a similar refractive index profile but including a central core that is extended beneath the outer optical cladding.

Typically, the optical fiber according to the present invention includes an inner cladding of radius $r_2$ positioned between the central core and the depressed trench to improve the optical fiber's bandwidth. Typically, the radius $r_2$ is less than 5 microns. In an exemplary embodiment, the optical fiber includes a central core immediately surrounded by an inner cladding, a depressed trench immediately surrounding the inner cladding, and an outer optical cladding.

Exemplary optical fibers according to the present invention possess central core diameters and numerical apertures that are typical of multimode fibers to allow connection to standard optical fibers. Thus, the optical fiber may have a central core diameter of 62.5+/−3 microns and a numerical aperture of 0.275+/−0.015. In another embodiment, the optical fiber possesses a central core diameter of 50+/−3 microns and a numerical aperture of 0.2+/−0.015.

Multimode fibers have been the subject of international standardization under standard ITU-T G.651 (withdrawn on Aug. 16, 2008) and the improved standard ITU-T G.651.1 (approved on Jul. 29, 2007), which in particular defines criteria for modal bandwidth-length product for overfilled launch (minimum at 850 nm of 500 MHz·km and minimum at 1300 nm of 500 MHz·km), numerical aperture (0.20±0.015), and core diameter (50±3 μm), required for compatibility between fibers. Some of the multimode fibers according to the present invention comply with the ITU-T G.651 and ITU-T G.651.1 recommendations, which are hereby incorporated by reference.

The optical fibers according to the present invention may be manufactured, for example, by drawing from final preforms.

A final preform may be manufactured by providing a primary preform with an outer overcladding layer (i.e., an overcladding process). The outer overcladding layer consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

In an exemplary embodiment, the primary preforms are manufactured using a PCVD process, which allows the shape of the central core's gradient refractive index profile to be controlled very precisely.

The depressed trench may be deposited on the inner surface of a substrate tube as part of the chemical vapor deposition process. More typically, the depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD).

In yet another exemplary embodiment, a primary preform is manufactured via an inside deposition process using a fluorine-doped substrate tube. The resulting tube containing the deposited layers may be sleeved by one or more additional fluorine-doped silica tubes so as to increase the thickness of the depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present invention is not limited to the exemplary embodiments described herein. The present optical fiber has good compatibility with other optical fibers and can be installed in numerous transmission systems.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. (Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. 2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. 2009/0175583 A1 for a Microbend-Resistant Optical Fiber, (Overton); U.S. Patent Application Publication No. 2009/0279835 A1 for a Single-Mode Optical Fiber Having Reduced Bending Losses, filed May 6, 2009, (de Montmorillon et al.); U.S. Patent Application Publication No. 2009/0279836 A1 for a Bend-Insensitive Single-Mode Optical Fiber, filed May 6, 2009, (de Montmorillon et al.); U.S. Patent Application Publication No. 2010/0021170 A1 for a Wavelength Multiplexed Optical System with Multimode Optical Fibers, filed Jun. 23, 2009, (Lumineau et al.); U.S. Patent Application Publication No. 2010/0028020 A1 for a Multimode Optical Fibers, filed Jul. 7, 2009, (Gholami et al.); U.S. Patent Application Publication No. 2010/0119202 A1 for a Reduced-Diameter Optical Fiber, filed Nov. 6, 2009, (Overton); U.S. Patent Application Publication No. 2010/0142969 A1 for a Multimode Optical System, filed Nov. 6, 2009, (Gholami et al.); U.S. Patent Application Publication No. 2010/0118388 A1 for an Amplifying Optical Fiber and Method of Manufacturing, filed Nov. 12, 2009, (Pastouret et al.); U.S. Patent Application Publication No. 2010/0135627 A1 for an Amplifying Optical Fiber and Production Method, filed Dec. 2, 2009, (Pastouret et al.); U.S. Patent Application Publication No. 2010/0142033 for an Ionizing Radiation-Resistant Optical Fiber Amplifier, filed Dec. 8, 2009, (Regnier et al.); U.S. Patent Application Publication No. 2010/0150505 A1 for a Buffered Optical Fiber, filed Dec. 11, 2009, (Testu et al.); U.S. Patent Application Publication No. 2010/0171945 for a Method of Classifying a Graded-Index Multimode Optical Fiber, filed Jan. 7, 2010, (Gholami et al.); U.S. Patent Application Publication No. 2010/0189397 A1 for a Single-Mode Optical Fiber, filed Jan. 22, 2010, (Richard et al.); U.S. Patent Application Publication No. 2010/0189399 A1 for a Single-Mode Optical Fiber Having an Enlarged Effective Area, filed Jan. 27, 2010, (Sillard et al.); U.S. Patent Application Publication No. 2010/0189400 A1 for a Single-Mode Optical Fiber, filed Jan. 27, 2010, (Sillard et al.); U.S. Patent Application Publication No. 2010/0214649 A1 for a Optical Fiber Amplifier Having Nanostructures, filed Feb. 19, 2010, (Burov et al.); U.S. patent application Ser. No. 12/765,182 for a Multimode Fiber, filed Apr. 22, 2010, (Molin et al.); and U.S. patent application Ser. No. 12/794,229 for a Large Bandwidth Multimode Optical Fiber Having a Reduced Cladding Effect, filed Jun. 4, 2010, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. 2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. 2009/0214167 A1 for a Buffer Tube with Hollow Channels, (Lookadoo et al.); U.S. Patent Application Publication No. 2009/0297107 A1 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. Patent Application Publication No. 2010/0092135 A1 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. Patent Application Publication No. 2010/0067855 A1 for a Buffer Tubes for Mid-Span Storage, filed Sep. 11, 2009, (Barker); U.S. Patent Application Publication No. 2010/0135623 A1 for Single-Fiber Drop Cables for MDU Deployments, filed Nov. 9, 2009, (Overton); U.S. Patent Application Publication No. 2010/0092140 A1 for an Optical-Fiber Loose Tube Cables, filed Nov. 9, 2009, (Overton);

U.S. Patent Application Publication No. 2010/0135624 A1 for a Reduced-Size Flat Drop Cable, filed Nov. 9, 2009, (Overton et al.); U.S. Patent Application Publication No. 2010/0092138 A1 for ADSS Cables with High-Performance Optical Fiber, filed Nov. 9, 2009, (Overton); U.S. Patent Application Publication No. 2010/0135625 A1 for Reduced-Diameter Ribbon Cables with High-Performance Optical Fiber, filed Nov. 10, 2009, (Overton); U.S. Patent Application Publication No. 2010/0092139 A1 for a Reduced-Diameter, Easy-Access Loose Tube Cable, filed Nov. 10, 2009, (Overton); U.S. Patent Application Publication No. 2010/0154479 A1 for a Method and Device for Manufacturing an Optical Preform, filed Dec. 19, 2009, (Milicevic et al.); U.S. Patent Application Publication No. 2010/0166375 for a Perforated Water-Blocking Element, filed Dec. 29, 2009, (Parris); U.S. Patent Application Publication No. 2010/0183821 A1 for a UVLED Apparatus for Curing Glass-Fiber Coatings, filed Dec. 30, 2009, (Hartsuiker et al.); U.S. Patent Application Publication No. 2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. 2010/0215328 A1 for a Cable Having Lubricated, Extractable Elements, filed Feb. 23, 2010, (Tatat et al.); and U.S. patent application Ser. No. 12/843,116 for a Tight-Buffered Optical Fiber Unit Having Improved Accessibility, filed Jul. 26, 2010, (Risch et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
   a central core positioned within an outer optical cladding, said central core having a radius $r_1$ and an alpha refractive index profile with respect to said outer optical cladding;
   an inner cladding positioned between said central core and said outer optical cladding, said inner cladding having a radius $r_2$ and a refractive index difference $\Delta n_2$ with said outer optical cladding;
   a depressed trench positioned between said inner cladding and said outer optical cladding, said depressed trench having a width $W_t$ and a refractive index difference $\Delta n_t$ with said outer optical cladding;
   wherein, at said central core's radius $r_1$, the refractive index difference between said central core and said outer optical cladding is zero;
   wherein said depressed trench's refractive index difference $\Delta n_t$ is between about $-7\times10^{-3}$ and $-10\times10^{-3}$;
   wherein said depressed trench's width $W_t$ is between 3 microns and 4.5 microns; and
   wherein said depressed trench has a volume V of between about $-30$ microns and $-40$ microns as defined by the expression $V=1000\times W_t\times\Delta n_t$.

2. The optical fiber according to claim 1, wherein the numerical aperture of the optical fiber exceeds that of a comparative optical fiber without a depressed trench by no more than 0.010.

3. The optical fiber according to claim 1, wherein said depressed trench's refractive index difference $\Delta n_t$ is between $-7.5\times10^{-3}$ and $-9.5\times10^{-3}$.

4. The optical fiber according to claim 1, wherein said depressed trench has a rectangular refractive index profile.

5. The optical fiber according to claim 1, wherein the difference between said inner cladding's radius $r_2$ and said central core's radius $r_1$ is less than about 5 microns.

6. The optical fiber according to claim 1, wherein:
   said central core has a diameter of 62.5+/−3 microns; and
   the optical fiber has a numerical aperture of 0.275+/−0.015.

7. The optical fiber according to claim 1, wherein:
   said central core has a diameter of 50+/−3 microns; and
   the optical fiber has a numerical aperture of 0.2+/−0.015.

8. The optical fiber according to claim 1, wherein, for two turns around a radius of curvature of 15 millimeters at a wavelength of 850 nanometers, the optical fiber's bending losses are at least 40 percent less than those of a comparative optical fiber without a depressed trench.

9. The optical fiber according to claim 1, wherein, for two turns around a radius of curvature of 10 millimeters at a wavelength of 850 nanometers, the optical fiber's bending losses are at least 30 percent less than those of a comparative optical fiber without a depressed trench.

10. The optical fiber according to claim 1, wherein, for two turns around a radius of curvature of 7.5 millimeters at a wavelength of 850 nanometers, the optical fiber's bending losses are at least 20 percent less than those of a comparative optical fiber without a depressed trench.

11. The optical fiber according to claim 1, wherein, for two turns around a radius of curvature of 5 millimeters at a wavelength of 850 nanometers, the optical fiber's bending losses are at least 20 percent less than those of a comparative optical fiber without a depressed trench.

12. A cable containing one or more optical fibers according to claim 1.

13. A multimode optical fiber, comprising:
   a central core positioned within an outer optical cladding, said central core having a radius $r_1$ and an alpha refractive index profile with respect to said outer optical cladding;
   an inner cladding immediately surrounding said central core and positioned within said outer optical cladding, said inner cladding having a radius $r_2$ and a refractive index difference $\Delta n_2$ with said outer optical cladding;
   a depressed trench positioned between said inner cladding and said outer optical cladding, said depressed trench having a width $W_t$ of between 2.0 microns and 4.5 microns and a refractive index difference $\Delta n_t$ with said outer optical cladding that is between about $-6\times10^{-3}$ and $-15\times10^{-3}$;
   wherein, at said central core's radius $r_1$, the refractive index difference between said central core and said outer optical cladding is zero;
   wherein said depressed trench has a volume V of between about $-30$ microns and $-40$ microns as defined by the expression $V=1000\times W_t\times\Delta n_t$; and
   wherein the optical fiber has a numerical aperture that exceeds the numerical aperture of a comparative optical fiber without a depressed trench by no more than 0.010.

14. The optical fiber according to claim 13, wherein, for two turns around a radius of curvature of 15 millimeters at a wavelength of 850 nanometers, the optical fiber's bending losses are at least 40 percent less than those of a comparative optical fiber without a depressed trench.

15. The optical fiber according to claim 13, wherein, for two turns around a radius of curvature of 7.5 millimeters at a wavelength of 850 nanometers, the optical fiber's bending losses are at least 20 percent less than those of a comparative optical fiber without a depressed trench.

16. A multimode optical fiber, comprising:
a central core positioned within an outer optical cladding, said central core having a radius $r_1$ and an alpha refractive index profile with respect to said outer optical cladding;
a depressed trench immediately surrounding said central core and positioned within said outer optical cladding, said depressed trench having a width $W_t$ and a refractive index difference $\Delta n_t$ with said outer optical cladding that is greater than $-9\times10^{-3}$;
wherein, at said central core's radius $r_1$, the refractive index difference between said central core and said outer optical cladding is zero;
wherein said depressed trench's width $W_t$ is between 3 microns and 4.5 microns;
wherein said depressed trench has a volume V of between about −30 microns and −40 microns as defined by the expression $V=1000\times W_t \times \Delta n_t$; and
wherein the optical fiber has a numerical aperture that exceeds the numerical aperture of a comparative optical fiber without a depressed trench by no more than 0.010.

17. The optical fiber according to claim 1, wherein the difference between said inner cladding's radius $r_2$ and said central core's radius $r_1$ is between about 2 microns and 4 microns.

18. The optical fiber according to claim 1, wherein said inner cladding immediately surrounds said central core, and said depressed trench immediately surrounds said inner cladding.

19. The optical fiber according to claim 13, wherein said depressed trench's refractive index difference $\Delta n_t$ is between about $-7\times10^{-3}$ and $-10\times10^{-3}$.

20. The optical fiber according to claim 13, wherein said depressed trench's refractive index difference $\Delta n_t$ is between about $-8\times10^{-3}$ and $-12\times10^{-3}$.

21. The optical fiber according to claim 13, wherein the optical fiber according to claim 13, wherein said depressed trench has a rectangular refractive index profile.

22. The optical fiber according to claim 13, wherein the difference between said inner cladding's radius $r_2$ and said central core's radius $r_1$ is between about 2 microns and 5 microns.

23. The optical fiber according to claim 13, wherein, for two turns around a radius of curvature of 10 millimeters at a wavelength of 850 nanometers, the optical fiber's bending losses are at least 35 percent less than those of a comparative optical fiber without a depressed trench.

* * * * *